United States Patent
Legras et al.

(10) Patent No.: US 12,325,527 B2
(45) Date of Patent: Jun. 10, 2025

(54) AIRCRAFT PROVIDED WITH AN ENGINE AND AN EXHAUST DUCT AROUND AN EXHAUST NOZZLE OF THE ENGINE

(71) Applicant: AIRBUS HELICOPTERS, Marignane (FR)

(72) Inventors: Guillaume Legras, Velaux (FR); Philippe Pinto, Saint-Chamas (FR); Christophe Albertini, Septemes les Vallons (FR)

(73) Assignee: AIRBUS HELICOPTERS, Marignane (FR)

( * ) Notice: Subject to any disclaimer, the term of this patent is extended or adjusted under 35 U.S.C. 154(b) by 95 days.

(21) Appl. No.: 18/380,240

(22) Filed: Oct. 16, 2023

(65) Prior Publication Data

US 2024/0190576 A1    Jun. 13, 2024

(30) Foreign Application Priority Data

Dec. 9, 2022 (FR) ........................................ 2213058

(51) Int. Cl.
*B64D 33/04* (2006.01)
(52) U.S. Cl.
CPC .................................. *B64D 33/04* (2013.01)
(58) Field of Classification Search
CPC ... B64D 37/26; B64D 33/04; F05D 2220/329; F05D 2260/602; F01N 2470/10; F01N 1/14; B64C 27/04
See application file for complete search history.

(56) References Cited

U.S. PATENT DOCUMENTS

| | | | | |
|---|---|---|---|---|
| 9,358,410 | B2 * | 6/2016 | Jullie | B64D 29/00 |
| 9,862,475 | B2 * | 1/2018 | Fietz | F16L 37/084 |
| 11,624,298 | B2 * | 4/2023 | Lefebvre | F01D 25/32 |
| | | | | 60/39.08 |
| 2013/0193271 | A1 * | 8/2013 | Otero | B64C 1/1453 |
| | | | | 244/136 |
| 2014/0373546 | A1 | 12/2014 | Ammon et al. | |

(Continued)

FOREIGN PATENT DOCUMENTS

| | | |
|---|---|---|
| CA | 2860080 A1 | 8/2013 |
| EP | 3084187 A1 | 10/2016 |

(Continued)

OTHER PUBLICATIONS

French Search Report forFrench Application No. FR2213058, Completed by the French Patent Office, Dated Jun. 27, 2023, 8 pages.

*Primary Examiner* — Jesse S Bogue
(74) *Attorney, Agent, or Firm* — BROOKS KUSHMAN P.C.

(57) ABSTRACT

An exhaust duct configured to be arranged around an exhaust nozzle of an engine, the exhaust duct having a plurality of sections. The sections are circular between an inlet section and an outlet section, with the exception of the sections of a deformed segment, each section of the deformed segment extending from a bottom sector to a top sector, the bottom sector having a non-circular shape so that at least a volume of liquid that is not able to reach, by force of gravity, the inlet section and the outlet section, is less than a volume threshold when the pitch and roll angles respectively lie within predetermined pitch and roll angle ranges.

12 Claims, 3 Drawing Sheets

(56) References Cited

U.S. PATENT DOCUMENTS

| | | | |
|---|---|---|---|
| 2015/0021438 A1* | 1/2015 | Casado Montero | B64C 1/1453 244/136 |
| 2016/0312707 A1 | 10/2016 | Py et al. | |
| 2022/0154613 A1 | 5/2022 | Haffner | |
| 2024/0026997 A1* | 1/2024 | Foucart-Gaudy | F16L 57/02 |
| 2024/0109666 A1* | 4/2024 | Legras | B64C 1/1453 |

FOREIGN PATENT DOCUMENTS

| | | |
|---|---|---|
| EP | 3381792 B1 | 5/2022 |
| WO | 2015092243 A1 | 6/2015 |

\* cited by examiner

AIRCRAFT PROVIDED WITH AN ENGINE AND AN EXHAUST DUCT AROUND AN EXHAUST NOZZLE OF THE ENGINE

CROSS-REFERENCE TO RELATED APPLICATIONS

This application claims priority to French patent application No. FR 22 13058 filed on Dec. 9, 2022, the disclosure of which is incorporated in its entirety by reference herein.

TECHNICAL FIELD

The present disclosure relates to an aircraft provided with an engine and an exhaust duct around an exhaust nozzle of the engine.

BACKGROUND

An aircraft and, for example, a rotorcraft, may comprise an engine that discharges combustion gases through an exhaust nozzle.

The engine is conventionally housed in a compartment of the aircraft referred to as the "engine compartment". The engine compartment may be defined by one or more firewalls and/or at least one cowling.

The aircraft may comprise an exhaust duct with circular sections that leads from the engine compartment to an environment outside the aircraft. This exhaust duct locally surrounds the exhaust nozzle. This exhaust duct may allow the combustion gases from the exhaust nozzle of an engine to be mixed with fresh air from the engine compartment and/or to be conveyed to preferred zones. The exhaust nozzle may be described as the primary or main nozzle, and the exhaust duct may be described as the secondary nozzle.

In the event of the engine failing to start, unburnt fuel may be discharged into the exhaust nozzle. Depending on the pitch and/or roll attitude of the aircraft, this unburnt fuel may fall by force of gravity into the exhaust duct and then into the engine compartment or may be discharged out of the aircraft.

The engine compartment may house a drainage system for discharging the unburnt fuel in turn.

However, some of the unburnt fuel may remain stuck in the exhaust duct and accumulate at a low point.

Certification requirements may permit the presence of a volume of unburnt fuel in an exhaust duct, provided that the volume of unburnt fuel remaining in the exhaust duct is less than a stated volume. Such a volume may be described as the "undrainable volume".

In order to achieve this aim, an exhaust duct may comprise a low point opening into a drainage system. Such a drainage system is effective but has a considerable weight.

Document US 2022/0154613 A1 describes a single-engine helicopter having a nozzle provided with a kidney-shaped section for directing the exhaust gases away from the tail boom of the helicopter.

Document EP 3 381 792 B1 describes an aerodynamic drainage device provided with a base linked to an upper part by an intermediate part.

Document EP 3 084 187 describes a drainage device for an engine. This device comprises a manifold, means for pumping the fluids contained in the manifold and monitoring means configured to signal an abnormal collection of fluids by the manifold.

Document CA 2 860 080 A1 is also known. Document CA 2 860 080 A1 describes an exhaust duct which covers an exhaust nozzle over a longitudinal distance, forming a peripheral opening between the exhaust nozzle and this exhaust duct.

SUMMARY

An object of the present disclosure is thus to propose an innovative exhaust duct with the aim of minimizing the volume of unburnt fuel in the exhaust duct.

Such an exhaust duct is configured to be arranged around an exhaust nozzle of an engine, the exhaust duct having a plurality of sections, said sections comprising an inlet section and an outlet section, the exhaust duct extending along a guiding line from the inlet section to the outlet section, the outlet section being configured to expel gases discharged by the exhaust nozzle.

Furthermore, the sections are circular between the inlet section and the outlet section, with the exception of the sections of a deformed segment arranged between and possibly including the inlet section and the outlet section, each section of the deformed segment comprising a bottom sector and a top sector, the bottom sector having a non-circular shape so that at least a volume of liquid that is not able to reach, by force of gravity, the inlet section and the outlet section, is less than a volume threshold when the pitch and roll angles respectively lie within predetermined pitch and roll angle ranges.

An aircraft may conventionally be designed so that its roll and pitch attitude is always within predetermined limits, in particular on the ground and indeed in certain conditions. The expression "predetermined pitch and roll angle ranges" means that these ranges are specified by the manufacturer and therefore represent a characteristic associated with the exhaust duct.

Compared to an exhaust duct with circular sections, the exhaust duct comprises a deformed segment. This deformed segment is modified, or indeed truncated, compared with a segment with circular sections, so that each volume of liquid that cannot reach the inlet section or the outlet section by force of gravity, with current roll and pitch angles lying within said predetermined roll and pitch angle ranges, is less than an imposed volume threshold. The deformed segment may have a flat spot, a gutter or one or more bosses, for example.

Irrespective of the roll and pitch attitude of the aircraft provided with an exhaust duct when on the ground and within the imposed attitude limits, the geometry of the exhaust duct ensures that a volume of liquid that might be retained in the exhaust duct is less than the permitted volume threshold. This permitted volume threshold may be imposed by certification requirements and, for example, by a certification regulation and/or an addition to a certification regulation.

There is therefore no need for a specific drainage system for draining this volume of liquid in exhaust duct.

Under these conditions, the weight of the system can be optimized.

Furthermore, the design of an exhaust duct is complex in particular because of the high temperature of the exhaust gases, in the region of several hundred degrees Celsius, the pressures that need to be withstood, and the vibratory stresses.

Modifying an exhaust duct is therefore a challenging operation. However, a maximum local deviation of between one and two centimeters compared with an exhaust duct with circular sections may be sufficient in order to limit each maximum volume of unburnt fuel in the exhaust duct to a permitted volume. The impact on the aerodynamics of the exhaust duct can then be limited, or within acceptable margins.

According to another, financial, aspect, the exhaust duct can be kept at a reasonable cost.

The exhaust duct may comprise one or more of the following features, taken individually or in combination.

The exhaust duct may thus comprise two half-shells joined together, one of the two half-shells comprising the bottom sector of each section and the other half-shell comprising the top sector of each section. The half-shell comprising the top sectors may be semicylindrical. Only the half-shell comprising the bottom sectors is then deformed. This minimizes the impact of truncating the exhaust duct.

Alternatively, the exhaust duct may comprise two identical half-shells joined together, the two half-shells being symmetrical with respect to a plane containing said guiding line, one of the two half-shells comprising the bottom sectors of said sections of the deformed segment and the other half-shell comprising the top sectors of said sections of the deformed segment.

In the case of a twin-engine aircraft, the two half-shells can be used to create either of the exhaust ducts. This solution reduces the need for manufacturing tools.

The bottom half-shell and the top half-shell of one exhaust duct can respectively form the top half-shell and the bottom half-shell of the other exhaust duct.

According to one possibility compatible with the preceding possibilities, at least the inlet section or the outlet section may be circular.

The deformed segment is possibly between the inlet section and the outlet section, not including these sections, or may comprise one of these sections.

According to one possibility compatible with the preceding possibilities, each section of the deformed segment may have a non-circular shape arranged between two arcs of a circle.

The non-circular shape corresponds to the region of the exhaust duct that is modified, compared to an exhaust duct with circular sections.

The non-circular shape may possibly be a flat shape.

The exhaust duct therefore comprises at least one planar part, that helps to avoid having a region forming a receptacle that does not allow fuel to be discharged.

According to another aspect, each section may be orthogonal to the guiding line.

The guiding line may possibly be curved.

Moreover, an aircraft may be provided with at least one engine, the engine comprising an exhaust nozzle for at least discharging gases, said aircraft comprising an exhaust duct according to the disclosure arranged at least partially around the exhaust nozzle.

The disclosure also relates to a method for designing an exhaust duct configured to be arranged around an exhaust nozzle of an engine, the exhaust duct having a plurality of sections, said sections comprising an inlet section and an outlet section, the exhaust duct extending along a guiding line from the inlet section to the outlet section, the outlet section being configured to expel gases discharged by the exhaust nozzle.

The design method comprises defining a hose with circular sections extending from the inlet section to the outlet section, the design method comprising at least one modification phase comprising the following steps:

determining at least one undrainable volume delimited by the hose and wherein a liquid cannot, by force of gravity, reach the inlet section and the outlet section at pitch and roll angles that respectively lie within predetermined pitch and roll angle ranges;

if no undrainable volume is greater than or equal to a volume threshold, assigning a geometry of the hose to the exhaust duct; and if at least one undrainable volume is greater than or equal to the volume threshold: (i) positioning a predetermined shape intersecting the hose, said at least one undrainable volume being present between the hose and the predetermined shape; (ii) modifying the hose, the part of the hose situated beneath the predetermined shape and comprising said at least one undrainable volume being cut off and replaced locally by the predetermined shape; and (iii) carrying out a new modification phase with the hose obtained after said modification of the hose.

The hose used at the start of the method may be in the form of a conventional exhaust duct with circular sections.

The expression "undrainable volume" denotes a volume wherein a liquid remains trapped when the permitted roll and pitch angles are observed.

According to the method, an operator defines a geometric shape referred to as a "hose". A predetermined shape is moved in relation to the hose in order to position the undrainable volume between this predetermined shape and the hose. The part of the hose lying beneath this predetermined shape and comprising the undrainable volume is then removed and replaced locally by the predetermined shape in order to form a new hose. The modification phase is then carried out iteratively until an undrainable volume less than a volume imposed by the manufacturer and/or a certification requirement is obtained. The exhaust duct to be manufactured is then defined so as to have the final shape of the hose obtained at the end of the design method.

The predetermined shape may possibly be a plane.

Determining at least one undrainable volume delimited by the hose and wherein a liquid cannot, by force of gravity, reach the inlet section and the outlet section at pitch and roll angles that respectively lie within said predetermined pitch and roll angle ranges may comprise the following step:

for a plurality of attitudes of the exhaust duct permitted by the predetermined roll and pitch angle ranges, each attitude being associated with a roll angle and a pitch angle, determining an intermediate volume wherein a liquid cannot, by force of gravity, reach the inlet section and the outlet section, said at least one undrainable volume being equal to the sum of said intermediate volumes.

This feature allows multiple attitudes to be taken into consideration.

The disclosure also relates to a method for manufacturing an exhaust duct configured to be arranged around an exhaust nozzle of an engine.

This manufacturing method comprises defining a geometry of the exhaust duct by applying the abovementioned design method, then a step of manufacturing the exhaust duct in order to give this exhaust duct said geometry.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

Figure 1:
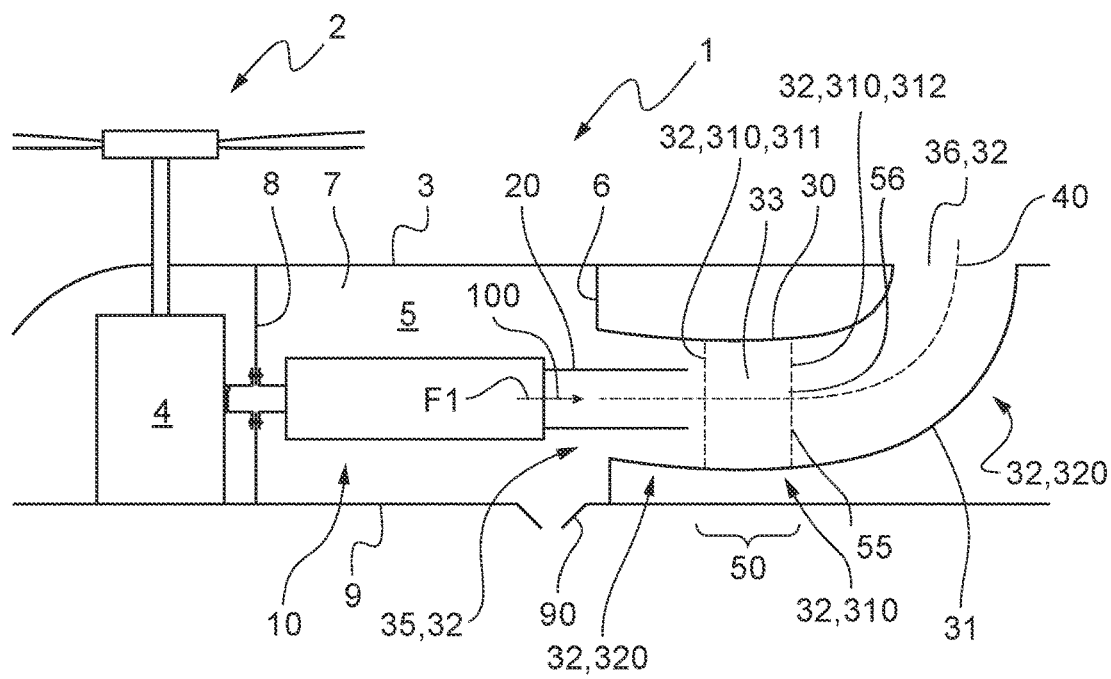
FIG. 1 is a cross-sectional view of an exhaust duct in an aircraft according to the disclosure.

FIG. 1 shows an exhaust duct 30 according to the disclosure. This exhaust duct 30 may be arranged on a vehicle and, in particular, an aircraft 1. The exhaust duct 30 and the aircraft 1 are configured to so that, in particular when on the ground, they are able to achieve a roll angle contained within a roll angle range imposed by the manufacturer and a pitch angle contained within a pitch angle range imposed by the manufacturer.

Such an aircraft 1 comprises an airframe 3 wherein there is also at least one engine 10. This engine 10 is housed at least partially in an engine compartment 5.

The engine compartment 5 is delimited by at least one wall 6, 7, 8, and 9. The wall or walls 6, 7, 8 and 9 may be firewalls, for example being fireproof. For example, the engine compartment 5 is delimited along a longitudinal axis by at least one longitudinal wall 6, 8. For example, the engine compartment 5 is delimited along a transverse axis by at least one transverse wall 7 and a cowl, and vertically at least by a bottom wall 9. According to the example shown, the aircraft 1 comprises a bottom wall 9 and a transverse wall 7 that extend between two longitudinal walls 6, 8.

The engine compartment 5 may possibly comprise a conventional drainage system. This drainage system may comprise at least one hole 90 provided in the bottom wall 9, at least one piping, at least one inclined plane provided in the bottom wall 9, etc.

Moreover, the engine or engines 10 may each comprise a power shaft, connected to a mechanical power transmission channel 4, possibly by passing through a longitudinal wall 8. This mechanical power transmission channel 4 may set in motion at least one rotor and, for example, a rotary wing 2.

The engine or engines 10 may be heat engines suitable for burning a fuel in order to set each power shaft in motion. According to one possibility, the engine or engines 10 may be turboshaft engines. Alternatively, the engine or engines 10 may be piston engines, for example.

Irrespective of the nature of the engine or engines 10 and their arrangement, each engine 10 comprises an exhaust nozzle 20 for at least discharging gases resulting from the combustion of the fuel in question in the direction shown by the arrow F1. For example, the exhaust nozzle 20 passes through a longitudinal wall 6.

Therefore, an exhaust duct 30 according to the disclosure surrounds the exhaust nozzle 20, i.e., the entire exhaust nozzle 20 or a segment of the exhaust nozzle 20 and, for example, at the very least, an end region of the exhaust nozzle 20 through which gases are discharged. For example, the exhaust duct 30 surrounds at least a part of the exhaust nozzle 20 situated outside the engine compartment 5.

The exhaust duct 30 may comprise a peripheral wall 31. The peripheral wall 31 delimits an inner volume 33 situated inside the exhaust duct 30 and accommodating at least one section of the exhaust nozzle 20.

Moreover, the exhaust duct 30 has a series of sections 32 aligned along a guiding line 40. The term "section" denotes a cross-section of the exhaust duct in a plane.

Each section 32 may extend orthogonally to the guiding line 40. Moreover, the guiding line 40 may be a straight segment, or may be curved, as shown in the examples.

Therefore, the exhaust duct 30 extends along the guiding line from an inlet section 35, which may open into the engine compartment 5, to an outlet section 36, that may open onto an environment EXT situated outside the aircraft 1. The air present in the compartment 5 may therefore be sucked into the exhaust duct 30 and is then discharged out of the vehicle with gases from the exhaust nozzle 20, through the outlet section 36.

Moreover, all the sections 32 are circular, apart from the sections 310 of a deformed segment 50. In other words, the sections 310 of the deformed segment 50 are not circular, the sections 320 not belonging to the deformed segment 50 being circular.

Reference number 32 is used to refer to any section, reference numbers 310, 320, 311, 312, 35, 36 being used to refer to specific sections if required.

The deformed segment 50 extends along the guiding line 40 between a first section 311 and a second section 312.

The deformed segment 50 is arranged between and possibly including the inlet section 35 and the outlet section 36. Therefore, the first section 311 may be the inlet section 35 or another section downstream of the inlet section 35 according to the example shown. Similarly, the second section 312 may be the outlet section 36 or another section upstream of the outlet section 36 according to the example in FIG. 1. In other words, the inlet section 35 and/or the outlet section 36 may be circular depending on the location of the deformed segment 50.

Each section 310 of the deformed segment 50 extends from a bottom sector 55 to a top sector 56, the top sector 56 being situated above the bottom sector 55 as viewed when the vehicle is resting on the ground in a normal position, i.e., not overturned and, for example, on its landing gear in the case of an aircraft 1.

Reference number 55 refers to any bottom sector of the deformed segment 50 and reference number 56 refers to any top sector of the deformed segment 50.

Therefore, at least the bottom sector 55 of each section of the deformed segment 50 has a non-circular shape. The purpose of this non-circular shape is to keep at least one volume of liquid below a volume threshold, this volume of liquid not being able, by force of gravity, to reach the inlet section 35 and the outlet section 36 when the pitch and roll angles respectively lie within said predetermined pitch and roll angle ranges.

Therefore, regardless of the current roll and pitch angles and as long as these current roll and pitch angles remain within the predetermined roll and pitch angle ranges, the exhaust duct does not contain any continuous volume of liquid greater than or equal to the volume threshold. For example, the exhaust duct 30 may comprise one or more separate volumes of liquid, each of these volumes of liquid being less than the volume threshold.

Figure 2:
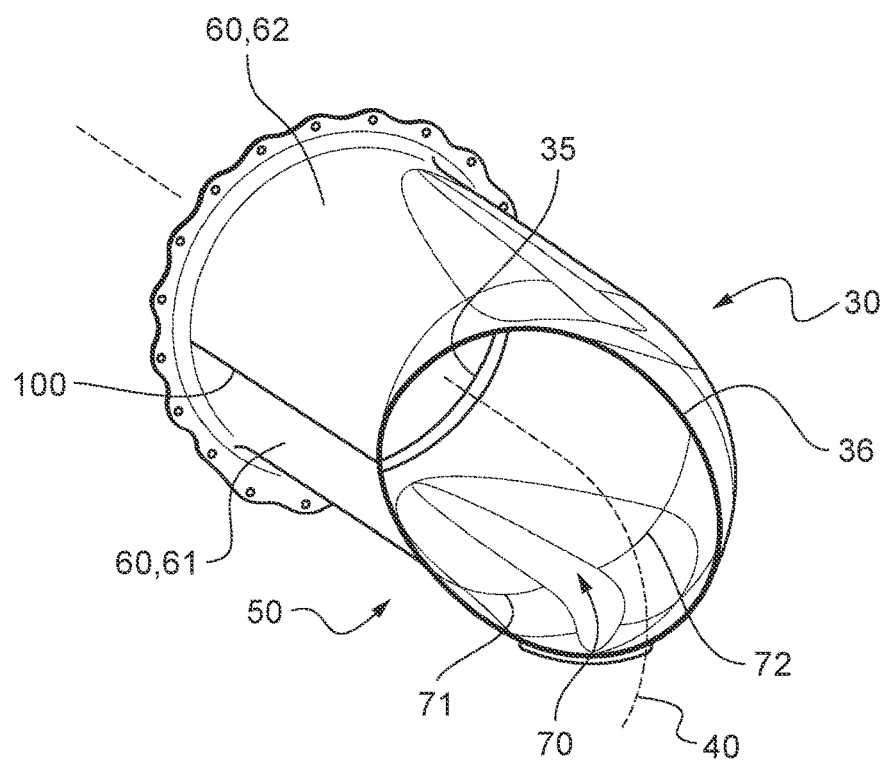
FIG. 2 is a diagram showing an exhaust duct according to the disclosure.

In reference to FIG. 2, each section of the deformed segment 50 may thus have a non-circular shape 70, possibly arranged between two arcs of a circle 71, 72. This non-circular shape is in particular present in the bottom sectors 55 of the sections 310 of the deformed segment 50.

In particular, the non-circular shape 70 may be a flat, i.e., straight shape.

Therefore, the exhaust duct 30 has a generally cylindrical shape, flattened locally at least at the bottom in order to avoid having a bottom region that cannot be drained and is likely to hold a volume of liquid greater than or equal to an imposed volume threshold.

According to another feature, the exhaust duct 30 may be manufactured using two half-shells 60, 61, 62 joined together. One of the two half-shells 61 comprises the bottom sectors 55 of the sections 310 of the deformed segment 50 and the other half-shell 62 comprises the top sectors 56 of the sections 310 of the deformed segment 50.

The two half-shells 61, 62 are possibly identical. Once they have been joined together to form the exhaust duct 30, the half-shells 61, 62 are symmetrical with respect to a plane 100 containing the guiding line 40.

Figure 3:
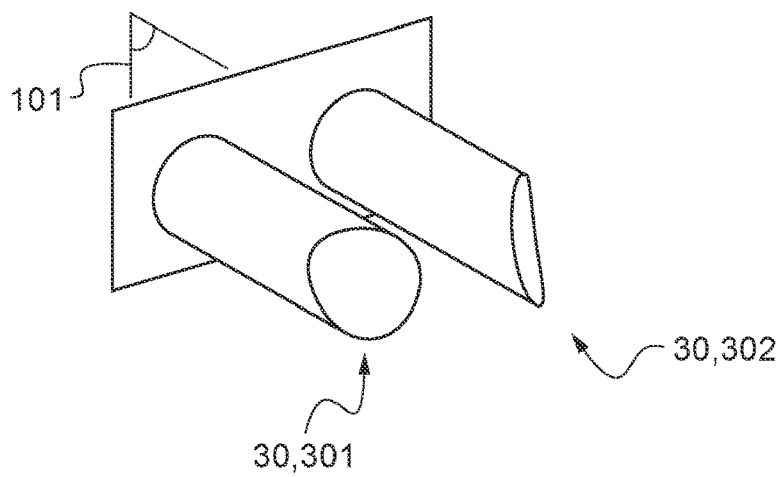
FIG. 3 is a diagram showing an aircraft comprising two exhaust ducts according to the disclosure.

In reference to FIG. 3, a vehicle 1 may comprise two engines 10 and two respective exhaust ducts 301, 302. The two exhaust ducts 301, 302 may then be identical and, for example, be arranged symmetrically with respect to a vertical plane 101.

Figure 4:
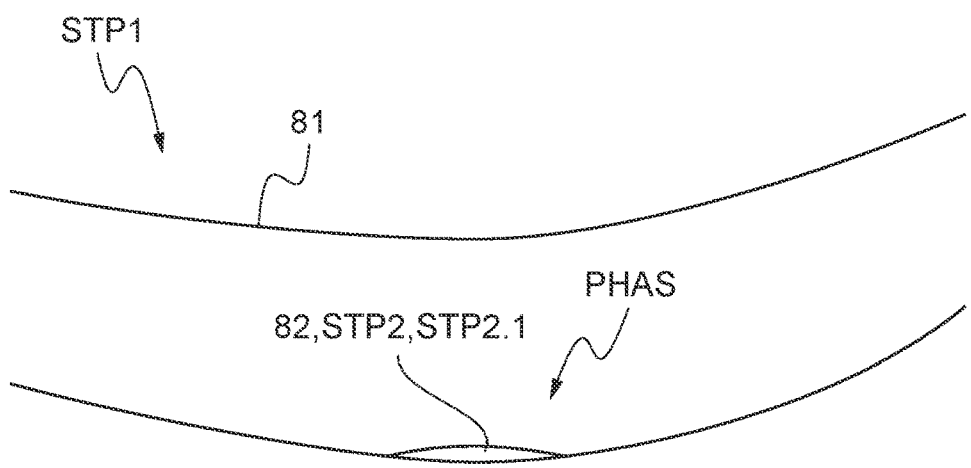
FIG. 4 is a diagram showing a step of determining at least one undrainable volume during the method for manufacturing an exhaust duct according to the disclosure.
Figure 5:
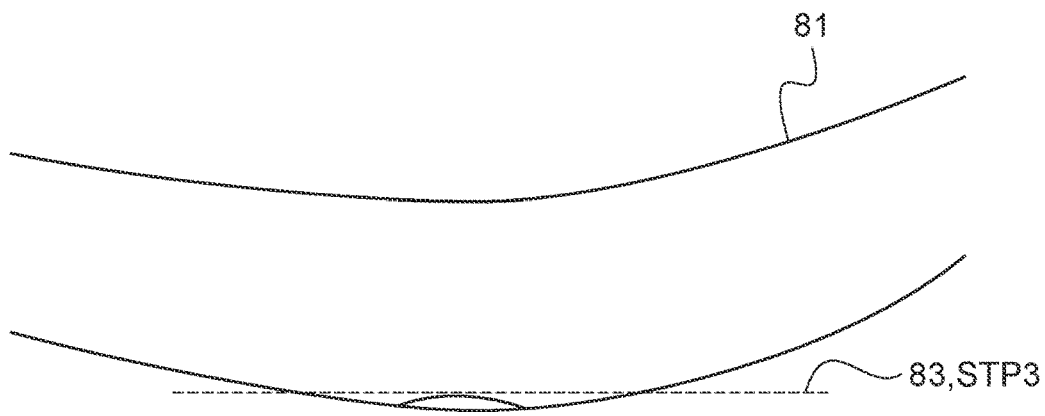
FIG. 5 is a diagram showing a step of positioning a predetermined shape intersecting the hose during the method for manufacturing an exhaust duct according to the disclosure.
Figure 6:
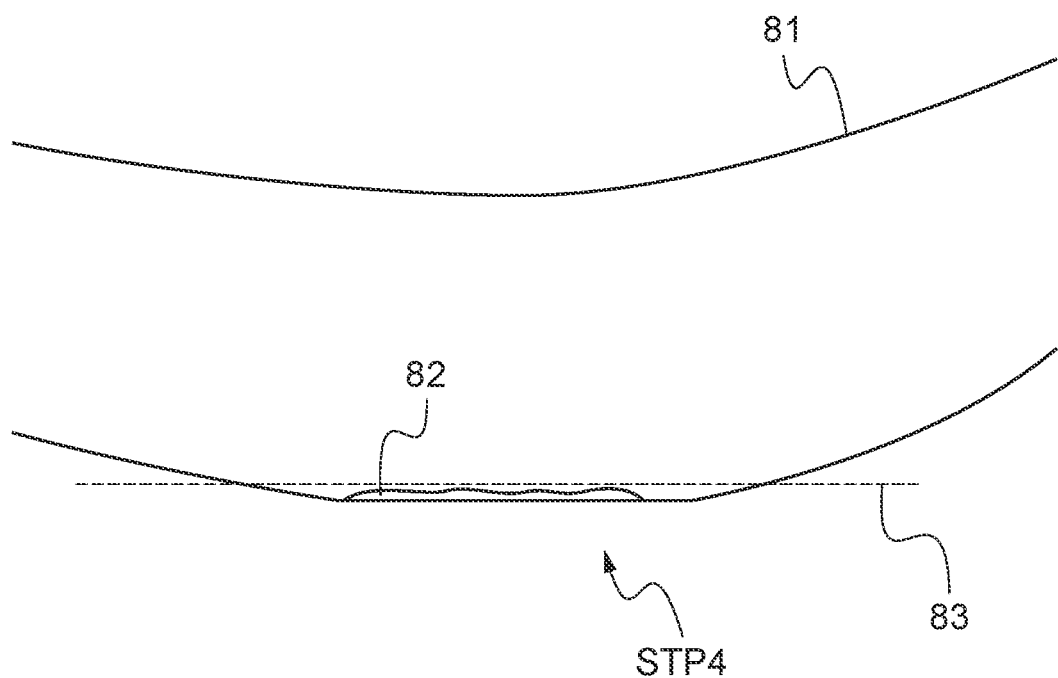
FIG. 6 is a diagram showing a step of modifying the hose during the method for manufacturing an exhaust duct according to the disclosure.

FIGS. 4 to 6 show a method for designing and manufacturing an exhaust duct 30 according to the disclosure.

In reference to FIG. 4, the method comprises defining STP1 a hose 81 with circular sections extending from the inlet section 35 to the outlet section 36, for example with a computer-aided design or CAD system.

Moreover, the method comprises at least one modification phase PHAS. Each modification phase PHAS comprises determining STP2 one or several undrainable volumes 82 delimited in the hose 81 and wherein a liquid cannot, by force of gravity, reach the inlet section 35 and the outlet section 36 at pitch and roll angles that respectively lie within said predetermined pitch and roll angle ranges.

For example, for a plurality of attitudes of the exhaust duct 30, each attitude corresponding to the exhaust duct 30 being tilted at a roll angle and a pitch angle permitted by the predetermined roll and pitch angle ranges, the modification phase PHAS comprises determining STP2.1 at least one intermediate volume wherein a liquid cannot, by force of gravity, reach the inlet section 35 and the outlet section 36, for example with the computer-aided design or CAD system. Each undrainable volume is then equal to the sum of the corresponding intermediate volumes.

If no undrainable volume 82 is greater than or equal to a volume threshold, the method comprises the locking the definition. In particular, the design method comprises assigning STP5 the final geometry of the hose, i.e., its shape, to the exhaust duct 30.

In reference to FIG. 5, if at least one undrainable volume is greater than or equal to the volume threshold, the modification phase PHAS comprises positioning STP3 a predetermined shape 83 that intersects the hose 81, for example with the computer-aided design system.

For example, the predetermined shape 83 may be a plane.

The predetermined shape 83 is positioned so that each undrainable volume is present between the hose 81 and this predetermined shape 83. The predetermined shape 83 may be tangent to at least one undrainable volume. The predetermined shape may extend horizontally in the reference frame of the aircraft.

In reference to FIG. 6, the modification phase PHAS then comprises modifying STP4 the hose 81. The hose 81 is deformed so that the part of the hose 81 situated beneath the predetermined shape 83 and comprising the undrainable volume or volumes is cut off and replaced locally by the predetermined shape 83. According to the example shown, a flat bottom replaces the entire truncated region of the hose 81.

The design method then comprises carrying out a new modification phase PHAS with the modified hose, and so on until each undrainable volume is less than the imposed volume threshold.

Figure 7:
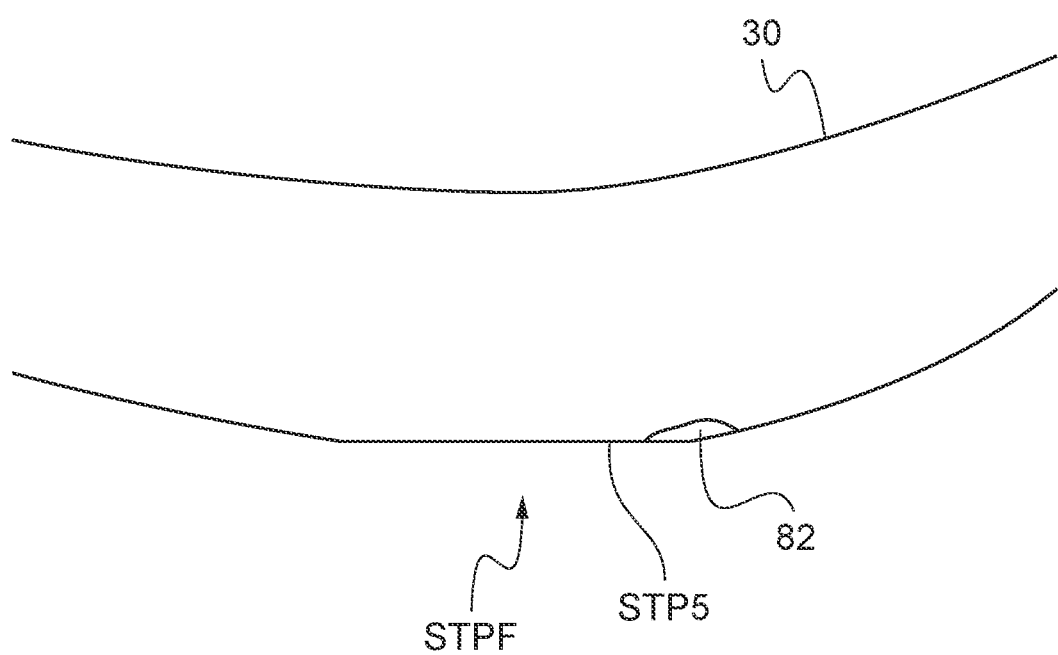
FIG. 7 is a diagram showing a step of manufacturing said exhaust duct during the method for manufacturing an exhaust duct according to the disclosure.

In reference to FIG. 7, the design method comprises, at the end of the modification phase or phases PHAS, assigning STP5 the final geometry of the hose to the future exhaust duct 30.

The exhaust duct 30 is then manufactured. For example, the manufacture STPF of the exhaust duct 30 based on the modified hose comprises manufacturing two half-shells, and pressing at least one of the half-shells.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. An exhaust duct configured to be arranged around an exhaust nozzle of an engine, the exhaust duct having a plurality of sections, the sections comprising an inlet section and an outlet section, the exhaust duct extending along a guiding line from the inlet section to the outlet section, the outlet section being configured to expel gases discharged by the exhaust nozzle,
   wherein the sections are circular between the inlet section and the outlet section, with the exception of the sections of a deformed segment, each section of the deformed segment comprising a bottom sector and a top sector, the bottom sector having a non-circular shape so that at least a volume of liquid that is not able to reach, by force of gravity, the inlet section and the outlet section, is less than a volume threshold when the pitch and roll angles respectively lie within predetermined pitch and roll angle ranges.

2. The exhaust duct according to claim 1,
   wherein the exhaust duct comprises two identical half-shells joined together, the two half-shells being symmetrical with respect to a plane containing the guiding line, one of the two half-shells comprising the bottom sectors of the sections of the deformed segment and the other half-shell comprising the top sectors of the sections of the deformed segment.

3. The exhaust duct according to claim 1,
   wherein at least the inlet section or the outlet section is circular.

4. The exhaust duct according to claim 1,
   wherein each section of the deformed segment has a non-circular shape arranged between two arcs of a circle.

5. The exhaust duct according to claim 4,
   wherein the non-circular shape is a flat shape.

6. The exhaust duct according to claim 1,
   wherein each section is orthogonal to the guiding line.

7. The exhaust duct according to claim 1,
   wherein the guiding line is curved.

8. An aircraft provided with at least one engine, the engine comprising an exhaust nozzle for at least discharging gases, the aircraft comprising the exhaust duct arranged least partially around the exhaust nozzle, wherein the exhaust duct is according to claim 1.

9. A method for designing the exhaust duct configured to be arranged around an exhaust nozzle of an engine, the exhaust duct having a plurality of sections, the sections comprising an inlet section and an outlet section, the exhaust duct extending along a guiding line from the inlet section to the outlet section, the outlet section being configured to expel gases discharged by the exhaust nozzle, wherein the design method comprises defining a hose with circular sections extending from the inlet section to the outlet section, the design method comprising at least one modification phase comprising the following steps:

determining at least one undrainable volume delimited by the hose and wherein a liquid cannot, by force of gravity, reach the inlet section and the outlet section at pitch and roll angles that respectively lie within predetermined pitch and roll angle ranges;

if no undrainable volume is greater than or equal to a volume threshold, assigning a geometry of the hose to the exhaust duct; and if at least one undrainable volume is greater than or equal to the volume threshold: (i) positioning a predetermined shape intersecting the hose, the undrainable volume (s) being present between the hose and the predetermined shape; (ii) modifying the hose, the part of the hose situated beneath the predetermined shape and comprising the undrainable volume (s) being cut off and replaced locally by the predetermined shape; and (iii) carrying out a new modification phase with the hose obtained after the modification of the hose.

10. The method according to claim 9, wherein the predetermined shape is a plane.

11. The method according to claim 9, wherein determining at least one undrainable volume delimited by the hose and wherein a liquid cannot, by force of gravity, reach the inlet section and the outlet section at pitch and roll angles that respectively lie within the predetermined pitch and roll angle ranges comprises:

for a plurality of attitudes of the exhaust duct permitted by the predetermined roll and pitch angle ranges, determining an intermediate volume wherein a liquid cannot, by force of gravity, reach the inlet section and the outlet section, the at least one undrainable volume being equal to a sum of the intermediate volumes.

12. A method for manufacturing the exhaust duct configured to be arranged around an exhaust nozzle of an engine, wherein the manufacturing method comprises defining a geometry of the exhaust duct by applying the design method according to claim 9, then a step of manufacturing the exhaust duct in order to give this exhaust duct said geometry.

* * * * *